US009850784B2

United States Patent
Barchan

(10) Patent No.: US 9,850,784 B2
(45) Date of Patent: Dec. 26, 2017

(54) METHOD FOR CONVERTING ENERGY WITH FUEL REGENERATION IN A CYCLIC PROCESS OF A HEAT ENGINE

(71) Applicant: Gennadij Pavlovich Barchan, Lobnya Moskovskaya obl. (RU)

(72) Inventor: Gennadij Pavlovich Barchan, Lobnya Moskovskaya obl. (RU)

( * ) Notice: Subject to any disclaimer, the term of this patent is extended or adjusted under 35 U.S.C. 154(b) by 203 days.

(21) Appl. No.: 14/901,717

(22) PCT Filed: Jun. 21, 2013

(86) PCT No.: PCT/RU2013/000529
§ 371 (c)(1),
(2) Date: Dec. 28, 2015

(87) PCT Pub. No.: WO2014/158054
PCT Pub. Date: Oct. 2, 2014

(65) Prior Publication Data
US 2016/0258326 A1    Sep. 8, 2016

(30) Foreign Application Priority Data

Mar. 27, 2013    (RU) ................................ 2013113358

(51) Int. Cl.
| | |
|---|---|
| *F01K 25/06* | (2006.01) |
| *F01K 11/02* | (2006.01) |
| *F01K 13/00* | (2006.01) |
| *F22B 1/18* | (2006.01) |
| *F22B 33/18* | (2006.01) |

(52) U.S. Cl.
CPC .............. *F01K 11/02* (2013.01); *F01K 13/00* (2013.01); *F01K 13/006* (2013.01); *F22B 1/18* (2013.01); *F22B 1/1846* (2013.01); *F22B 33/18* (2013.01); *Y02E 20/344* (2013.01)

(58) Field of Classification Search
CPC ........ F01K 13/00; F01K 11/02; F01K 13/006; F22B 1/1846; F22B 1/18; F22B 33/18
USPC ........................................................... 60/649
See application file for complete search history.

(56) References Cited

FOREIGN PATENT DOCUMENTS

| | | | | |
|---|---|---|---|---|
| CA | 2662053 A1 | * | 10/2009 | |
| WO | WO 2012095556 A1 | * | 7/2012 | .............. C10J 3/726 |

* cited by examiner

*Primary Examiner* — Jason Shanske
(74) *Attorney, Agent, or Firm* — John Alumit

(57) ABSTRACT

In the method for conversion with recovery of energy carriers in a cyclical process of a thermal engine, a first recirculation cycle is formed involving gas generator, device for converting kinetic and thermal energy into mechanical energy, hydrogenation reactor, and gas generator. Water is evaporated in steam boilers, and steam is fed into turbine for converting steam energy into mechanical energy. In this process, steam boilers are located in gas generator and in hydrogenation reactor. The steam is carried onward from conversion device into condenser, and a second recirculation cycle is formed. Atmospheric oxygen from an air bubble is supplied to gas generator. The air is cooled, and cooling operation is repeated, until a maximum residual water content in the air of 0.2 g/m3 is attained. Formed condensate is collected and used steam boilers. Invention makes it possible to simplify process of recovering carbon oxides formed in thermal engines.

7 Claims, 2 Drawing Sheets

METHOD FOR CONVERTING ENERGY WITH FUEL REGENERATION IN A CYCLIC PROCESS OF A HEAT ENGINE

CROSS-REFERENCE TO RELATED APPLICATION

This is a national stage patent application of PCT/RU2013/000529 filed on Jun. 21, 2013 and referenced in WIPO Publication No. WO/2014/158054. The earliest priority date claimed is Mar. 27, 2013.

FEDERALLY SPONSORED RESEARCH

Not Applicable

SEQUENCE LISTING OR PROGRAM

Not Applicable

BACKGROUND

The invention relates to a method for conversion with recovery of energy carriers in a cyclical process of a thermal engine in accordance with the preamble to claim 1.

The invention can be employed in energy technology, specifically for methods for conversion of internal energy of hydrocarbon fuels into mechanical work.

The known modern methods for thermal energy production, except for atomic, nuclear, nuclear fusion, solar and thermal energy, are based on a direct combustion of the energy carriers. That is, a complete oxidation of all the combustible fuel components is involved (see for example L. S. Stermann et al., "Wärme- und Atomkraftwerke" [Thermal and Nuclear Power Plants], M., Energoisdat, 1982). .

Despite their manifold nature, the drawbacks of these known methods have a common character and include the following:

It is not possible to process wastes having a water content of over 75%.

The theoretical efficiency of the best thermal power plants is at most 75%, and the effective efficiency is a maximum of 35%.

The exhaust gases emitted into the ambient air pollute the environment and globally impair life on Earth.

The non-renewable natural resources, such as fuel resources, are ineffectively utilized.

The biomasses of plants and the products of defecation of the human and animals are used only occasionally and ineffectively for generating energy.

From the prior art, a method for recovering the energy extracted in a thermochemical cyclical process and converting it into mechanical energy is known. By this method, a hydrogen/carbon oxide mixture (an energy carrier delivered to a motor) with a molar ratio of 3:1 is fed from a container into a reactor system. There, methane/water vapor mixture (working medium) occurs in the course of a catalytic reaction. It is fed into the work chamber of the motor. As a result of the mixture expansion, mechanical energy is generated. The spent methane/water vapor mixture flows into the cooling system of a gas-cooled high-temperature atomic reactor, which is located outside the motor. There, the methane/water vapor mixture converts into the original hydrogen and carbon oxide (see International Application WO 03/091549, Class F01K25/06, Nov. 6, 2003).

This method, in comparison to the known methods, leads to a considerable drop in fuel consumption, but has the following drawbacks:

To obtain the cyclical process course, a high-temperature thermal energy source must be present outside the motor.

The method can be performed only in stationary fashion and in the immediate vicinity of a high temperature energy source.

In this method, other types of raw materials containing carbon cannot be used.

Non-electrical vehicle motors cannot be supplied using this method.

The energy carrier (hydrogen/carbon oxide mixture) must be produced in a special facility.

From the prior art, a method for converting the energy liberated in an exothermal process into mechanical work is known. This method includes supplying a starting raw material to a first reactor (gas generator) and a cooperation of the raw material components in an exothermal process. This produces hydrogen and carbon oxide. They are fed into a reactor methanization system (a special case of a Fischer-Tropsch reactor). There, working medium is formed by means of a catalytic reaction. The working medium is a methan/steam mixture. As it expands, mechanical work is done in the motor. The spent working medium is fed into a second reactor for recovery and then returned to the first reactor. In the process, the starting raw material in the first reactor is exposed to an autothermal or thermal gasification with liberation of hydrogen and carbon oxide. The hydrogen and the carbon oxide are fed into the reactor methanization system of byproducts. The catalytic reaction between hydrogen and carbon oxide is carried out at a temperature of 600 K to 1400 K and at a pressure between 0.6 and 20 mPa (Russian Patent 2323351, Class F01K23/04, Apr. 27, 2008).

This method has the following drawbacks:

The gases and energy liberated in the reformation or gasification of the starting raw material in the gas generator go unused.

The plasma-chemical reforming or gasification is used only for processing water mixtures.

The methanization process, at a temperature of over 700 K, is difficult to perform with commercially available catalysts.

The temperature and pressure limitation between 600 K and 1400 K and 0.6-20 mPa significantly limits the results that can be achieved.

The closest prior art to the invention in its technical essence and the attainable effect is a method for conversion with a recovery of energy carriers in a cyclical process of a thermal engine. In this method, hydrocarbon fuel and oxygen are supplied to a gas generator. The fuel is gasified or converted under autothermal or thermal conditions, resulting in a hydrogen/carbon oxide mixture. The resultant hydrogen/carbon oxide mixture is transported into an apparatus for conversion of its kinetic and thermal energy into mechanical energy. After that, the hydrogen/carbon oxide mixture flows into a hydrogenation reactor. There, hydrocarbons and heat-generated waters are formed by a catalytic process. They are fed via an energy conversion device into a gas generator for conversion, and in such a way a first recirculation cycle is formed, specifically: gas generator-device for converting kinetic energy into mechanical energy-hydrogenation reactor-device for converting thermal and kinetic gas energy into mechanical energy-gas generator. The water is evaporated in a steam boiler heated by gasification and hydrogenation products and is fed into a device for steam energy conversion into mechanical energy, for instance into a turbine (Russian Patent 2386819, Class F01K23/04, Apr. 20, 2010).

This known technical provision successfully improves a number of ratings and overcomes the drawbacks intrinsic to the cyclical recovery process that have come to be recognized in practice with the implementation of the method.

However, the following drawbacks have been found:

Methane is not a target product of this technical energy system. Hence the use of the methanization system for the sake of carbon oxide recovery has the result that the self-consumption of energy because of the compression of the hot methane and steam mixture increases, and that the cost for equipment in this method increase.

The molar ratio of hydrogen to carbon oxide in the synthesis gas (product gas) is 3:1. This limits the usability of the method.

The obligatory use in terms of method technology of the plasma-chemical method is not always expedient, because it limits the usage of other gasification methods for starting raw materials.

The utilization of noble gases or mixtures thereof that is a precondition for the technical method reduces the efficiency of the gas generators and reactors for hydrogenating the carbon oxides.

It is the object of the invention to develop a method for conversion with a cyclical carbon oxide recovery in internal combustion engines and steam boiler systems, in which both extraction and processing can be done using hydrocarbon-containing raw materials, including gases, various mixtures of substances, and industrial and household wastes.

The technical effect is a simplification of the course of recovery of the carbon oxides that occur in thermal engines or steam boiler systems or in various technical processes.

This object is attained by the claimed features.

SUMMARY

The object is attained in a method for conversion with recovery of energy carriers in a cyclical process of a thermal engine. In this method, hydrocarbon fuel and oxygen are supplied to a gas generator. The fuel is gasified or, under autothermal or thermal conditions, converted so that a hydrogen/carbon oxide mixture is created. The hydrogen/carbon oxide mixture produced is fed into a device for converting its kinetic and thermal energy into mechanical energy. After that, the hydrogen/carbon oxide mixture is fed into a hydrogenation reactor, in which hydrocarbons and heat generated water are formed in a catalytic process, after which they are fed into the gas generator for conversion. Thus a first recirculation cycle is created: gas generator-device for converting the kinetic and thermal energy into mechanical energy-hydrogenation reactor-gas generator. The water is then evaporated in steam boilers. The steam is then fed into a device, such as a turbine, for converting the steam energy into mechanical energy. The steam boilers are located in the gas generator. The steam generator is located in the gas generator and in the hydrogenation reactor. The water is heated in the latter. In this way, an isothermal course of the gasification and hydrogenation processes is maintained in the gas generator and in the hydrogenation reactor. The steam is carried onward from the device for converting the steam energy into mechanical energy into a condenser. From there, the condensate flows back into the steam boilers. Thus a second recirculation cycle is created: steam boilers-device for converting the steam energy into mechanical energy-condenser-steam boilers. In the process, the condensate is distributed proportionately between the steam boilers in accordance with their respective capacity. The hydrogen/carbon oxide mixture is formed in the gas generator under autothermal or thermal conditions during the gasification or transformation of the hydrocarbon fuels. Simultaneously, a hydrocarbon/heat-generated water mixture is formed by a catalytic process in the hydrogenation reactor. Pure oxygen from an oxygen station (air decomposition plant) or atmospheric oxygen as an air ingredient from an air bubble is supplied to the gas generator of the engine. The air flowing into the air intake is cooled down or heated beforehand in a heat exchanger cascade (the heat exchangers arranged in stages) to the dew point and then is cooled to a temperature of 0° . . . −3° C., depending on climate conditions, in an expansion turbine. The cooling operation is repeated until a maximum residual water content in the air of 0.2 g/m3 is attained. The condensate formed is collected and used for feeding the steam boilers. After that, the atmospheric oxygen is transported into the oxygen station or directly into the gas generator.

The air in the heat exchanger cascade is cooled with cold air or with cold nitrogen or with a cold mixed gas or heated by means of hot water or steam. The condensate is used for feeding the steam boilers.

The steam from the steam boiler constructed in the hydrogenation reactor is fed into the device for converting the steam energy into mechanical energy, via a steam superheater built into the gas generator.

In the gas generator of the engine, a product gas (synthesis gas) with a molar ratio H2:CO and H2:CO2, which is required and sufficient for complete recovery of the carbon oxides, is produced.

At a molar ratio CO:CO2 of less than 1, the additional hydrogen required for the carbon dioxide hydrogenation is drawn from the heat-generated water or the superheated steam.

A portion of the steam from the device for converting the steam energy into mechanical energy is carried onward into the steam superheater built into the gas generator. After that, the superheated steam then arrives back in the device for converting the steam energy into mechanical energy.

A portion of the hydrocarbons produced in the hydrogenation reactor is separated from the mixture produced and carried onward for further processing into a rectification column.

DRAWINGS

One exemplary embodiment of the method of the invention will be described in further detail in conjunction with the accompanying drawings. In the drawings.

DETAILED DESCRIPTION

Figure 1:
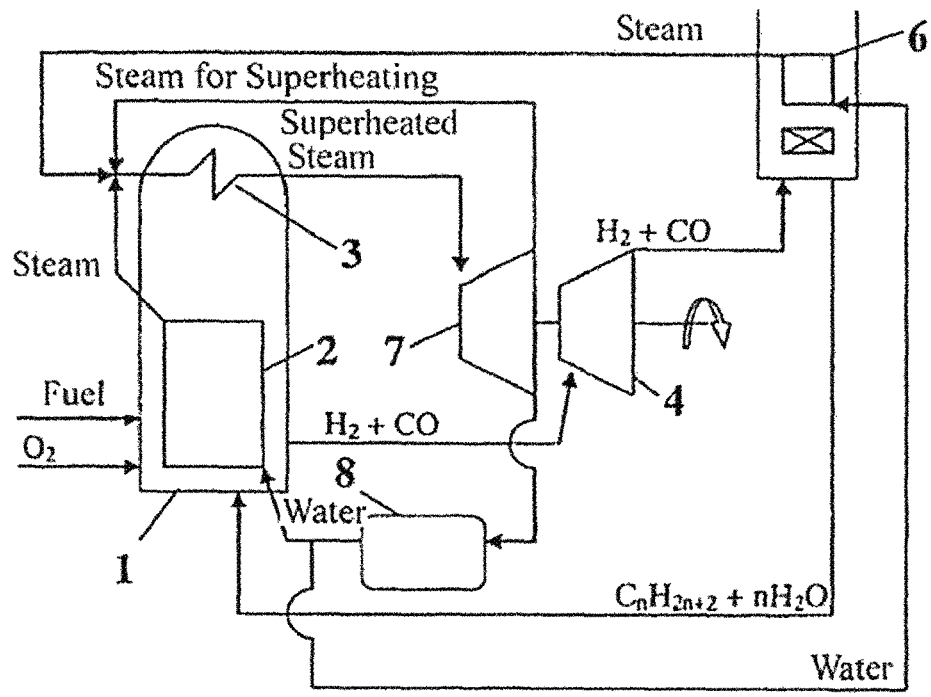
FIG. 1 is an overview of a thermal engine for performing the described method for energy conversion.

The described method for energy conversion can be performed in a thermal engine, such as an internal combustion engine of FIG. 1. The thermal engine includes a gas generator 1 with a steam boiler 2 built into it and with a steam superheater 3. The gas generator 1 is connected to oxygen and hydrocarbon fuel supplies. The outlet opening for hydrogen and carbon oxides at the gas generator 1 is also connected to a device 4, for converting their kinetic and thermal energy into mechanical energy, for instance to a turbine. The energy conversion device 4 is connected by its outlet to a hydrogenation reactor 5. A second steam boiler 6 is located in the hydrogenation reactor 5. The outlet of the second steam boiler 6 is connected to a device 7 for converting the steam energy into mechanical energy, for instance to a turbine. The outlet of the turbine is connected to a condenser 8. The water outlet of the condenser 8 communicates with the steam boilers 2 and 6. The outlet for hydrocarbons and heat generated water of the hydrogenation reactor 5 is connected to the gas generator 1.

The second steam boiler 6 can be connected to a device 7 for converting the steam energy into mechanical energy, via the steam superheater 3. Alternatively, a steam discharge line from the device 7 for converting the steam energy into mechanical energy can be connected via the steam superheater 3 to the device 7 for converting the steam energy into mechanical energy.

The outlet for hydrocarbons and heat-generated water of the hydrogenation reactor communicates with a rectification column 9.

Moreover, an air bubble or an oxygen station (not shown in the drawings) can be used for oxygen supply for the gas generator 1. (In the case of air preparation, a heat exchanger cascade and an expansion turbine (not shown) can also be employed.)

The method for energy conversion with recovery of energy carriers in a cyclical process of a thermal engine provides that hydrocarbon fuel and oxygen are delivered to the gas generator 1. There, the fuel is gasified or converted, under autothermal or thermal conditions, forming a hydrogen/carbon oxide mixture. The hydrogen/carbon oxide mixture produced flows into the device 4 for converting its kinetic and thermal energy into mechanical energy. After that, the hydrogen/carbon oxide mixture is carried onward into the hydrogenation reactor 5. There, hydrocarbons and heat-generated water are formed in a catalytic process and afterward are fed into the gas generator 1 for conversion. This involves a first recirculation cycle: gas generator 1-device 4 for conversion of kinetic and thermal energy into mechanical energy-hydrogenation reactor 5-gas generator 1.

Water is evaporated in steam boilers 2 and 6, and the water vapor is then fed into the device 7, for instance a turbine, for converting the steam energy into a mechanical energy. The steam boilers 2 and 6 are located in the gas generator 1 and in the hydrogenation reactor 5, respectively. Thus as a result of the water heating in the gas generator 1 and in the hydrogenation reactor 5, an isothermal course of the gasification and hydrogenation processes in them is maintained. The water vapor flows from the device 7 for converting the steam energy into mechanical energy into the condenser 8. From there, the condensate flows back into the steam boilers 2 and 6. Thus a second recirculation cycle is created: steam boilers 2 and 6-device 7 for converting the steam energy into mechanical energy-condenser 8-steam boilers 2 and 6.

The condensate is distributed proportionally between the steam boilers 2 and 6 in accordance with their capacity. A hydrogen/carbon oxide mixture is formed in the gas generator 1 during the gasification or conversion of the hydrocarbon fuels under autothermal or thermal conditions, and a mixture of hydrocarbons and heat-generated water is formed in the hydrogenation reactor 5 during the catalytic process.

Pure oxygen from an oxygen station or atmospheric oxygen from an air bubble is delivered to the engine's gas generator 1. The air flowing into the air intake is cooled or heated, depending on climatic conditions, previously in a heat exchanger cascade to the dew point and then cooled to a temperature of 0° to −3° C. in an expansion turbine. The cooling operation is repeated until a maximum residual water content in the air of 0.2 g/m3 is attained. The condensate formed is collected and used to feed the steam boilers 2 and 6. After that, the atmospheric oxygen is transported into the oxygen station or directly into the gas generator 1.

The air is cooled in the heat exchanger cascade with cold air or with cold nitrogen or a cold mixed gas, or heated with hot water or steam, and the condensate is used for feeding the steam boilers 2 and 6.

The steam of the steam boiler 6 located in the hydrogenation reactor 5 (see FIG. 1) is fed into the device 7 for converting the steam energy into mechanical energy, via the steam superheater 3 built into the gas generator 1.

In the gas generator 1 of the engine, a product gas (synthesis gas) with a molar ratio of $H_2:CO$ and $H_2:CO_2$ is produced, which is required and sufficient for a complete recovery of the carbon oxides.

If the molar ratio $CO:CO_2$ is less than 1, then the additional hydrogen required for the carbon dioxide hydrogenation is taken from the heat-generated water or from the superheated steam.

Figure 2:
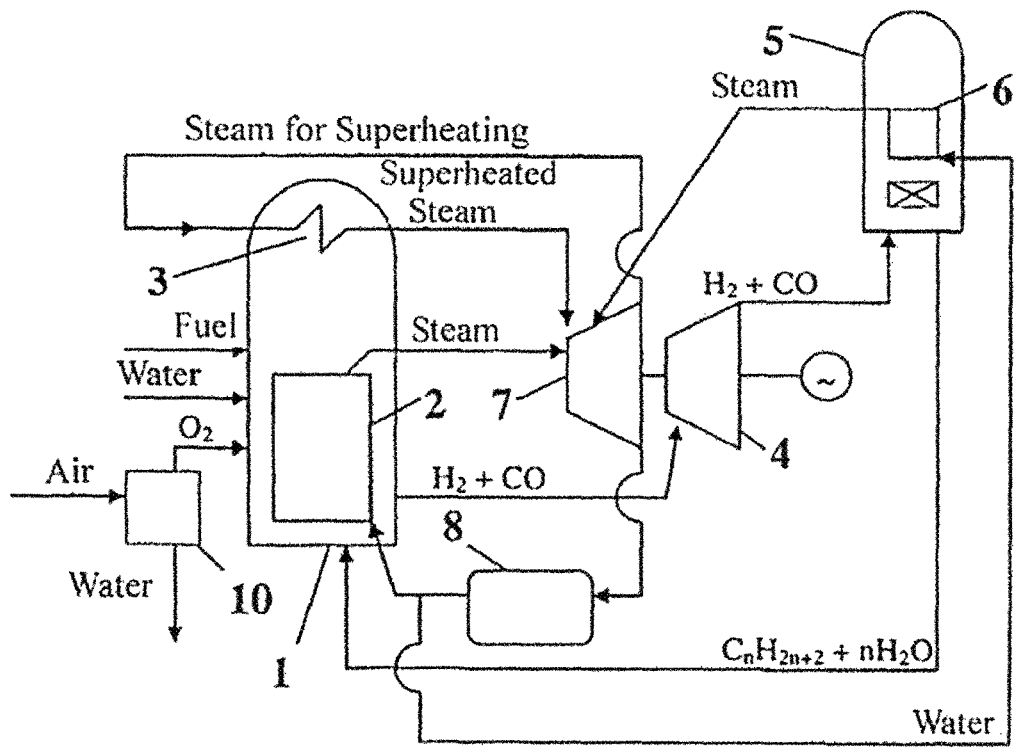
FIG. 2 is an overview of the thermal engine for performing the described method for energy conversion with simultaneous production of chemical products in a rectification column.

A portion of the steam (see FIG. 2) is fed from the device 7 for converting the steam energy into mechanical energy into the steam superheater 3 built into the gas generator 1. After that, the superheated steam returns to the device 7 for converting the steam energy into mechanical energy.

Figure 3:
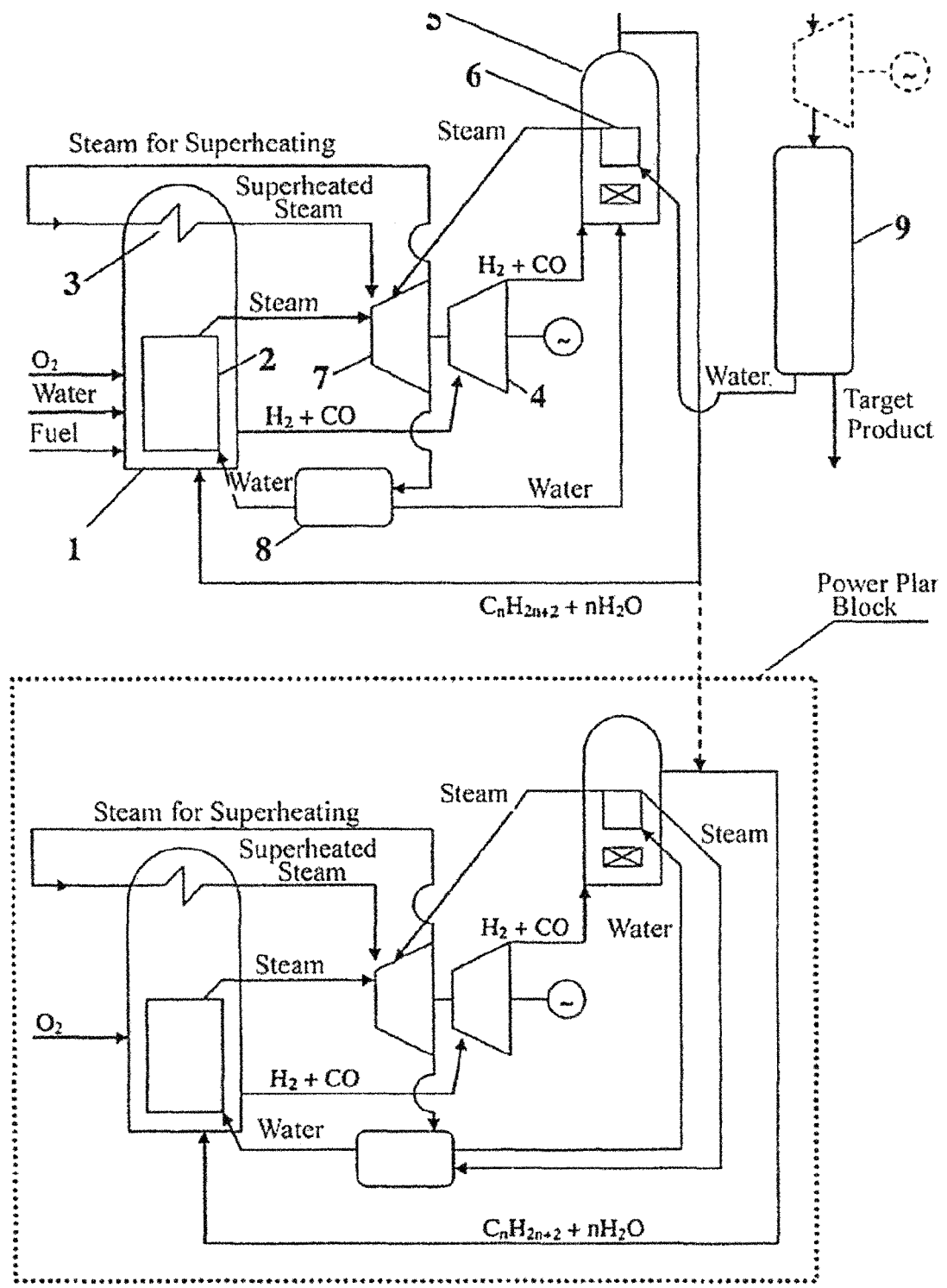
FIG. 3 is an overview of a thermal engine for performing the described method for energy conversion with a steam superheater, which is connected to a device for converting steam energy into mechanical energy.

A portion of the hydrocarbons generated in the hydrogenation reactor 5 is separated from the previous mixture in the hydrogenation reactor and carried onward for further processing into a rectification column 9 (see FIG. 3).

The aforementioned systems may be combined, as shown in FIG. 3.

As hydrocarbon fuels, gas or liquid fuel can be used. The following should be noted: Since the thermal content of its oxidation is maximal with respect to a quantity of 1 liter, the gas generator 1, which is basically a combustion chamber or a unit of gas generators 1 of the engine, is supplied from a fuel tank or gas bottle. In the gas generator 1, a product gas is formed at a temperature of 1625 to 2500 K in the open air, or at a temperature of 785 to 1620 K with catalysts. The product gas (synthesis gas) is a mixture of hydrogen and carbon oxides. The process is preferably carried out a pressure of 0.11 to 30 mPa. In a plasma-catalytic process, the plasma temperature is set in the range between 1700 and 10000 K and higher. In the hydrogenation reactor 5, hydrocarbons with from C1 to C25 carbon atoms, oxygen-containing C1 to C4 hydrocarbon compounds, and optionally water vapors are formed during the catalytic hydrogenation of the carbon oxides under catalytic isothermal conditions. The process is carried out at 3.1 mPa and at a temperature of 610 K.

The theoretical effective efficiency can attain 0.733; the Carnot performance coefficient can be approximately −0.89.

The method of the invention can be employed in energy production as well as mechanical engineering, specifically automotive engineering or shipbuilding and can also be used in the chemical industry for generating mechanical energy for turbine shaft operation, for driving conveyors and current generators, and at the same time for producing various chemical products, for instance using rectification columns.

The invention claimed is:

1. A method for conversion with recovery of energy carriers in a cyclical process of a thermal engine in accordance with the following:

hydrocarbon fuel and oxygen are supplied to a gas generator (1), and the fuel is gasified or, under autothermal or thermal conditions, converted so that a hydrogen/carbon oxide mixture is created;

the hydrogen/carbon oxide mixture produced is fed into a turbine (4) for converting kinetic and thermal energy into mechanical energy, and the hydrogen/carbon oxide mixture is supplied to a hydrogenation reactor (5), in which hydrocarbons and heat-generated water are formed in a catalytic process;

the hydrocarbons and heat-generated water are then fed into the gas generator (1) for conversion, so that a first recirculation cycle is created; and the heat-generated water is evaporated in steam boilers (2 and 6), and steam is then fed into a turbine (7), for converting the steam energy into mechanical energy wherein the steam boilers (2, 6) are located in the gas generator (1) and in the hydrogenation reactor (5), so that, by heating water in the gas generator (1) and in the hydrogenation reactor (5), an isothermal course of the gasification and hydrogenation processes is maintained in the gas generator (1) and in the hydrogenation reactor (5);

wherein the steam is carried onward from the turbine (7) for converting steam energy into mechanical energy into a condenser (8); and condensate from the turbine flows back into the steam boilers (2, 6), so that a second recirculation cycle is thus created;

wherein the condensate is distributed proportionately between the steam boilers (2, 6);

wherein the hydrogen/carbon oxide mixture is formed in the gas generator (1) under autothermal or thermal conditions occurs during the gasification or transformation of the hydrocarbon fuels, and the hydrocarbon/heat-generated water mixture forms simultaneously by the catalytic process in the hydrogenation reactor (5);

wherein pure oxygen from an oxygen station or atmospheric oxygen from an air bubble is supplied to the gas generator (1) of the engine;

wherein air flowing into air intake is cooled down or heated beforehand in a heat exchanger cascade, depending on climate conditions, to the dew point and then is cooled to a temperature of 0° to −3° C. in an expansion turbine until a maximum residual water content in the air of 0.2 g/m3 is attained;

wherein the condensate formed is collected and used for feeding the steam boilers (2, 6); and wherein when oxygen is derived from the atmosphere, the atmospheric oxygen is transported into the oxygen station or directly into the gas generator (1).

2. The method of claim 1, wherein the air in the heat exchanger cascade is cooled with cold air or with cold nitrogen or with a cold mixed gas or heated by hot water or the steam.

3. The method of claim 1, wherein the steam from the steam boiler constructed in the hydrogenation reactor (5) is fed into the turbine (7) for converting the steam energy into mechanical energy, via a steam superheater (3) built into the gas generator (1).

4. The method of claim 1, wherein in the gas generator of the engine, a product gas with a molar ratio H2:CO and H2:CO2, which is required and sufficient for complete recovery of the carbon oxides, is produced.

5. The method of claim 1, wherein at a molar ratio CO:CO2 of less than 1, additional hydrogen required for the hydrogenation of carbon dioxide is drawn from the heat-generated water or superheated steam.

6. The method of claim 1, wherein a portion of the steam from the turbine (7) for converting steam energy into mechanical energy is carried onward into a steam superheater (3) built into the gas generator (1); and that the superheated steam then arrives back in the turbine (7) for converting the steam energy into mechanical energy.

7. The method of claim 1, wherein a portion of the hydrocarbons produced in the hydrogenation reactor is separated from the mixture produced and carried onward for further processing into a rectification column (9).

* * * * *